Nov. 7, 1967  J. W. MOSS  3,351,167
THERMOSTAT SAFETY CONTROL FOR AIR ACTUATED CLUTCHES
Filed Aug. 9, 1965  4 Sheets-Sheet 1

JACK W. MOSS
INVENTOR.

BY *Wayland D. Keith*
HIS AGENT

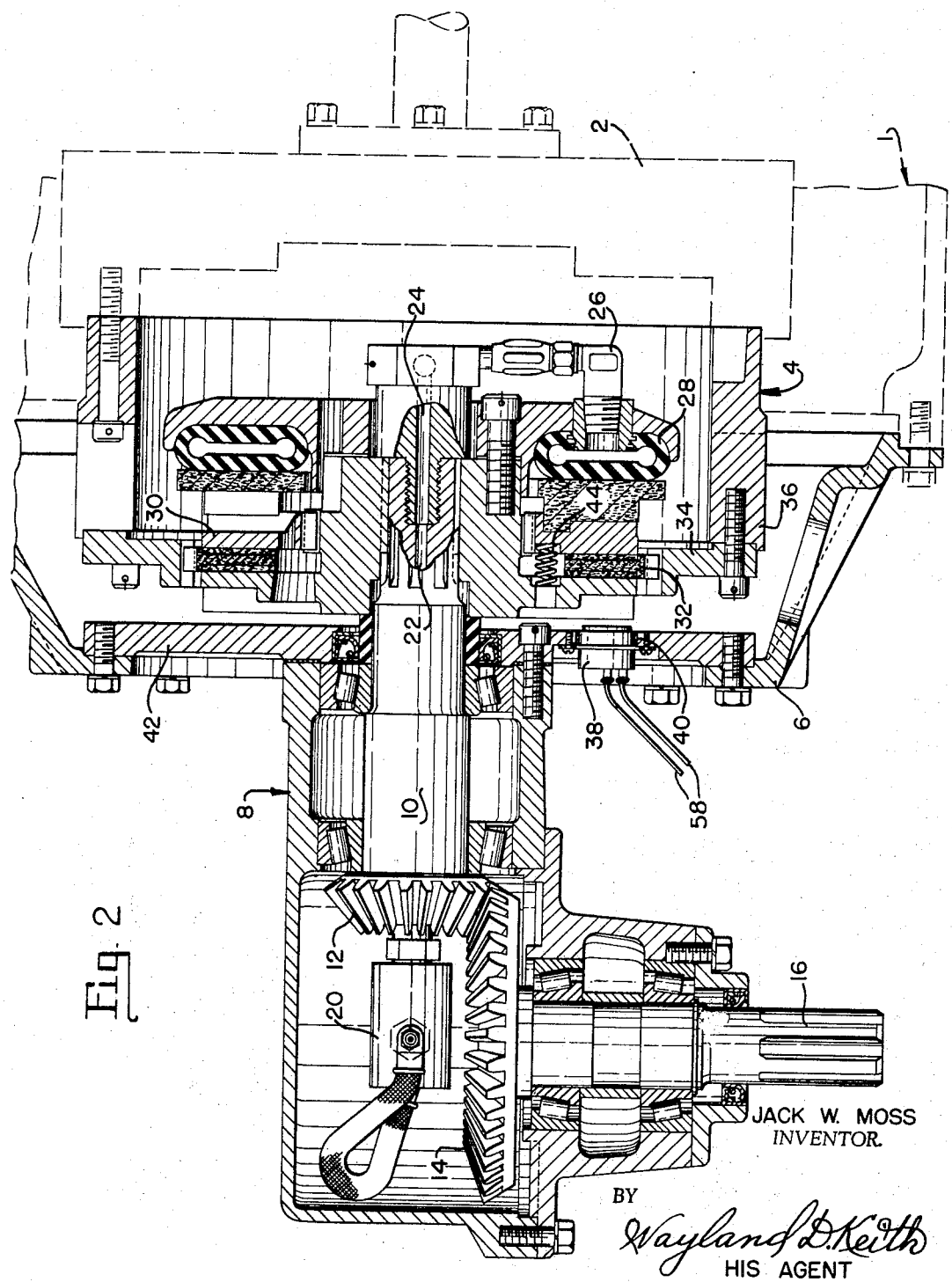

Nov. 7, 1967 J. W. MOSS 3,351,167
THERMOSTAT SAFETY CONTROL FOR AIR ACTUATED CLUTCHES
Filed Aug. 9, 1965 4 Sheets-Sheet 3
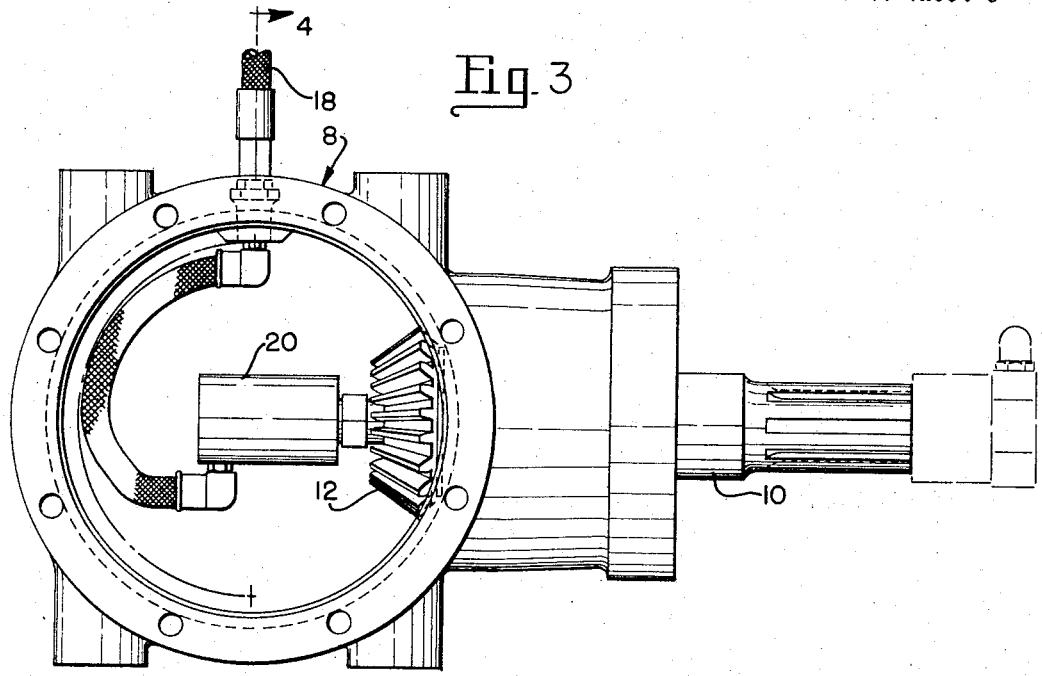
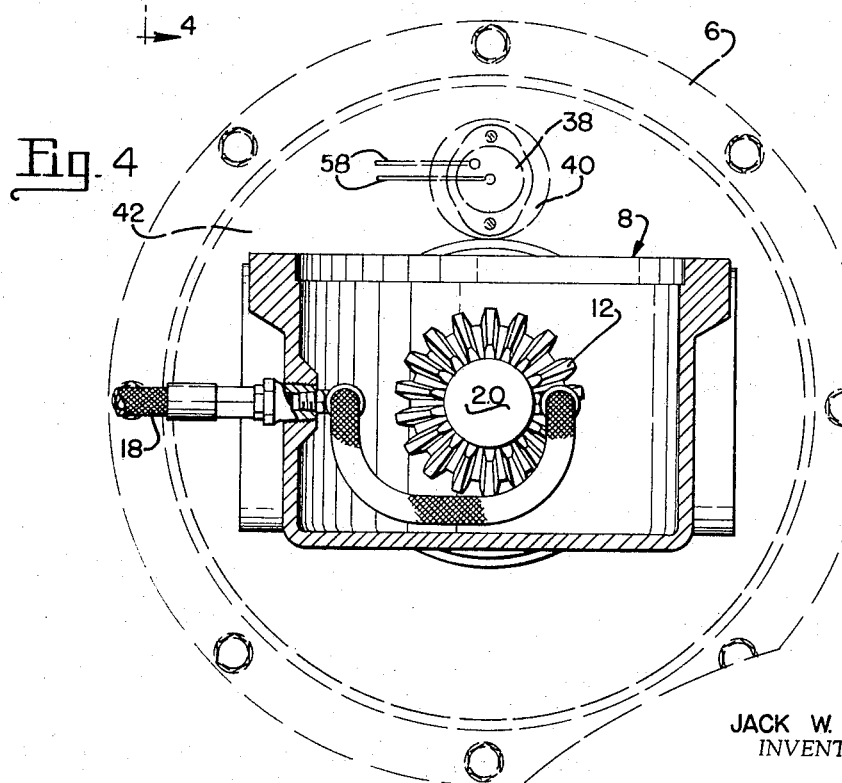
JACK W. MOSS
INVENTOR.
BY
*Wayland D. Keith*
HIS AGENT Nov. 7, 1967   J. W. MOSS   3,351,167
THERMOSTAT SAFETY CONTROL FOR AIR ACTUATED CLUTCHES
Filed Aug. 9, 1965   4 Sheets-Sheet 4
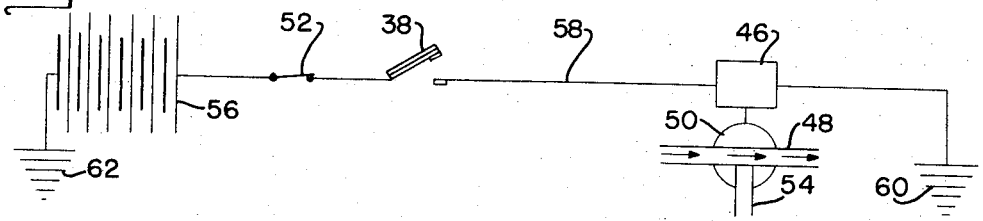
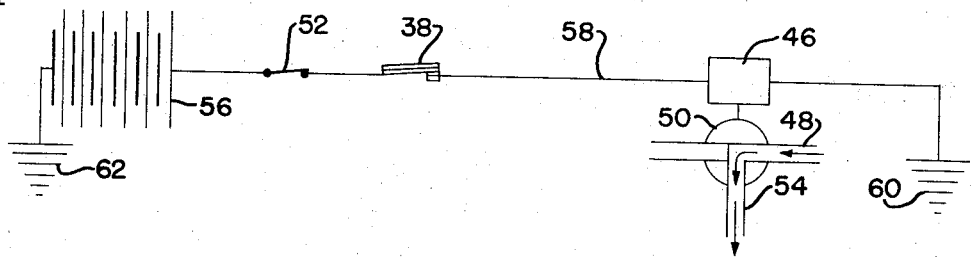
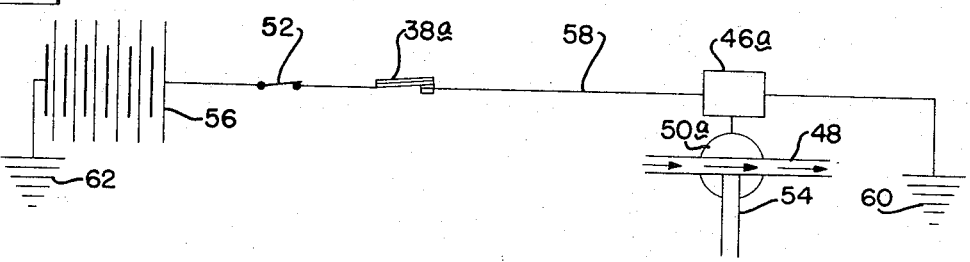
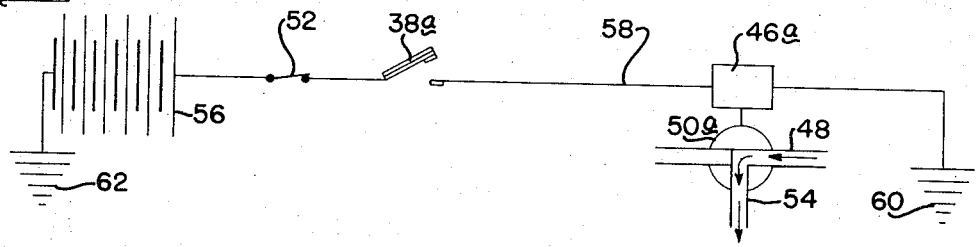
JACK W. MOSS
INVENTOR.
BY
Wayland D Keith
HIS AGENT

# United States Patent Office 3,351,167
Patented Nov. 7, 1967

3,351,167
THERMOSTAT SAFETY CONTROL FOR AIR ACTUATED CLUTCHES
Jack W. Moss, Wichita Falls, Tex., assignor to Wichita Clutch Company, Wichita Falls, Tex., a corporation of Texas
Filed Aug. 9, 1965, Ser. No. 478,146
5 Claims. (Cl. 192—56)

ABSTRACT OF THE DISCLOSURE

A safety thermostat control unit for use with a fluid clutch, having friction members therein, which thermostat control unit senses the temperature of the clutch and opens or closes electrical contacts therein to close a circuit through a solenoid valve within a fluid pressure line leading to the fluid clutch so as to exhaust air from the clutch to release the clutch to prevent damage thereto from overheating. The thermostat control unit may be inserted into a hole within the clutch housing so as to be in heat transfer relation, which thermostat switch may be inserted into a hole in the housing from the exterior thereof, as a wired unit, and removed from the hole, as a wired unit, from the exterior of the housing.

---

This invention relates to thermo controls for clutches and more particularly to thermostat controls for air actuated clutches.

Various thermostat controls have been proposed heretofore. However, these for the most part, were not readily adjustable for use with clutches to prevent damage to the clutch elements should the elements become overheated.

During use, clutches in heavy machinery often become heated and damaged beyond use, and should the clutch fail under certain conditions, damage to property and life could occur.

The present thermo controlled device for clutches is so positioned as to be in heat sensing relation to the portion of the clutch which becomes heated when the clutch is subject to excessive use.

The present thermo responsive unit actuates a switch, which switch may be either "normally open" or "normally closed" depending upon the particular operation which the thermo unit is to control.

The present unit is shown to be constructed on an air actuated clutch, which clutch embodies an axially expansible elastomer tube which tube, when expanded, urges clutch plates into engagement and permits the disengagement of the clutch plates when the tube is deflated.

The present unit is shown in combination with a clutch housing and a power takeoff, such as is usually used on engines.

An object of this invention is to provide a thermo control unit, for use with a clutch, which thermo control unit will actuate an air supply valve to declutch the apparatus should the clutch become too hot.

Another object of the invention is to provide a thermo control unit for clutches, which unit will sense the temperature without the need for normal inspection or the reading of temperature gauges.

Another object of the invention is to provide a thermo control for a clutch which may be readily inserted into the clutch housing, through a hole therein, without the necessity of dismantling a clutch for the installation of the control unit.

Still another object of the invention is to provide a thermostat switch for controlling a solenoid actuated valve, which switch will automatically open or close the valve in accordance with the response of the thermo actuated switch to temperature.

With these objects in mind and others which will become manifest as the description proceeds, reference is to be had to the accompanying drawings in which:

FIG. 2 is a longitudinal, sectional view taken through the clutch housing, the clutch therein and through the power takeoff housing, showing portions thereof in elevation and showing the thermostatically controlled switch installed within the clutch housing;

FIG. 3 is a fragmentary, elevational view of the air piping arrangement through the power takeoff unit;

FIG. 4 is a sectional view taken on line 4—4 of FIG. 3, looking in the direction indicated by the arrows, showing the clutch housing in dashed outline, and showing a thermostatically actuated switch therein in dashed outline;

FIG. 5 is a diagrammatic view of an electric circuit, showing a normally open, thermostatically actuated switch therein and showing a solenoid valve in position to pass air therethrough into the clutch;

FIG. 6 is a view similar to FIG. 5, but showing the thermostatically actuated switch closed, with air being exhausted from the thermostat valve;

FIG. 7 is a view similar to FIG. 5, but of a normally closed thermostatically controlled switch, showing the air valve in position to exhaust air from the clutch actuating element; and FIG. 8 is a view similar to FIG. 5, but showing the thermostatically controlled switch in closed position to direct air into the clutch actuating element.

Figure 1:
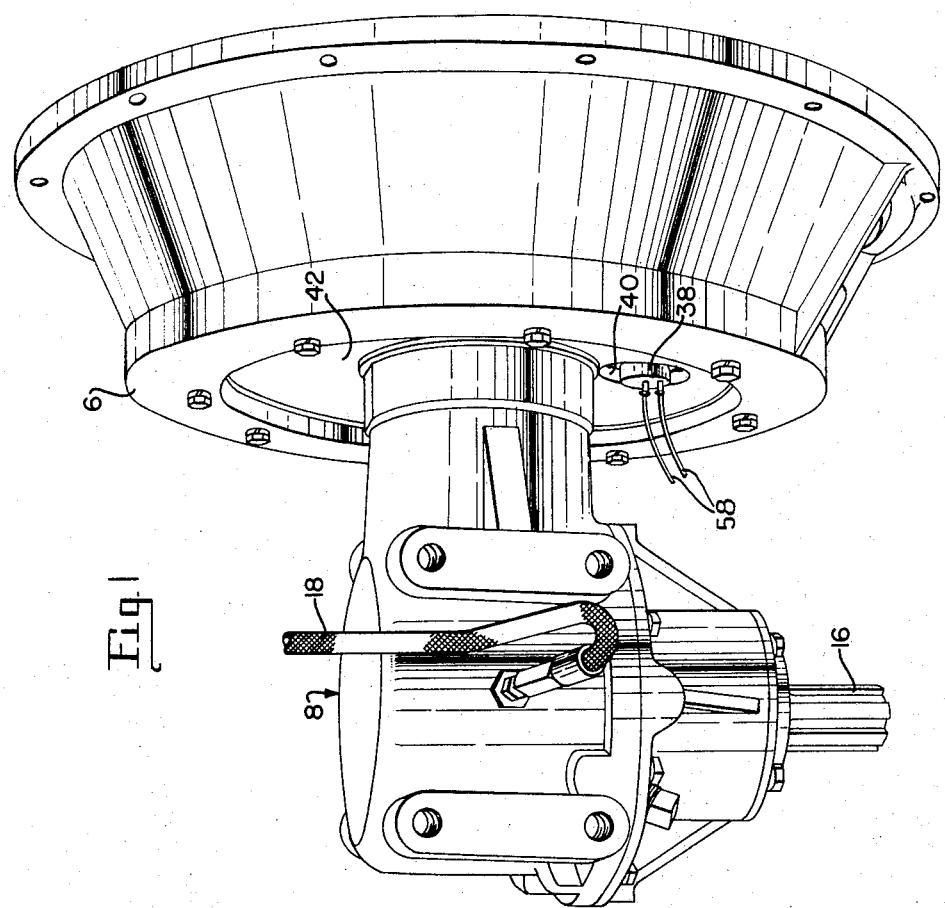
FIG. 1 is a perspective, elevational view of a portion of a clutch housing and a right angle gear drive power takeoff, showing a thermostatically actuated switch within the clutch housing, and showing an air hose leading into the power takeoff to direct air to the clutch actuator element.

With more detailed reference to the drawings the numeral 1 designates generally a fragmentary portion of a prime mover, such as an internal combustion engine, having a flywheel 2 to which a clutch designated generally by the numeral 4 is connected in a manner well understood in the art of clutches. The clutch 4 is enclosed within a housing 6, to which housing a power takeoff drive unit 8 is connected so as to transmit power from clutch 4 through shaft 10 and bevel gearing 12 and 14 to drive a power output shaft 16 in a manner well understood in the art of power takeoff drives.

The present clutch 4 is of the axially expansible fluid or air tube type, the air from which is conducted into power takeoff housing 8 by a conduit 18, which conduit extends through the power takeoff housing and is connected with a rotatable fluid seal 20 mounted on the outer end of shaft 10. The shaft 10 is hollow, as indicated at 22, to conduct air therethrough and into conduit 24 and through fittings 26 into an axially expansible tube 28 to urge clutch disc 30 into engagement with the complementary clutch disc 32, which is connected in driving relation with toothed clutch plate 34, so as to be driven by the cylindrical member 36 of clutch 4.

The clutch unit 4 is conventional in form; however, when operated intermittently by disengagement and engagement of clutch plates 30 and 32 or when the clutch plates 30 slip relative to clutch plate 32, heat is generated within housing 6. If the heat within the housing 6 exceeds a predetermined temperature, the axially expansible, elastomer tube 28 will be endangered, and furthermore the coefficient of friction between clutch plates 30 and 32 will diminish rapidly, therefore, if the heat generated exceeds a predetermined degree, the clutch plates 30 and 32 will become damaged and ineffective, and must be removed and replaced, which would also be true of the elastomer tube 28.

Since the clutch is usually remote from the operator, the heat within clutch housing 6 cannot be readily determined, frequently not until substantial damage has been done, which would necessitate the removal of the damaged parts and the replacement thereof, the "down time" for which is often critical, as well as expensive.

The present invention involves placing a thermostat switch unit 38 through a hole 40 in a plate 42, cover for which plate forms a part of housing 6. The heat sensing thermostat switch unit 38 has an area thereof in close heat transfer relation to clutch plates 30 and 32, therefore, before the heat within housing 6 reaches such critical point as to injure the clutch plates 30 and 32, a solenoid valve will be actuated, which will exhaust air from axially expansible elastomer clutch tube 28 so that clutch springs 44 will move clutch plate 30 out of engagement with clutch plate 32, which will prevent further heating due to the frictional engagement of the clutch plates 30 and 32.

The thermostat switch unit 38 may be either of the normally open type whereby, so long as the switch of the thermostat switch unit 38 is open, air will pass through conduit 48 and through solenoid valve 50, as indicated by the arrows in FIG. 5, into the clutch through conduit 18. However, with the control switch 52 closed, as indicated in FIG. 6, and when the heat attains a temperature which closes thermostat switch unit 38, as shown in FIG. 6, the solenoid of valve 50 will switch the valve 50 to direct air out through air outlet passage 54, as indicated by the arrows in FIG. 6. When the temperature within the clutch housing 6 has cooled to a degree at which the clutch will not be injured by operation, the control switch 52 may be opened momentarily, which will reset solenoid valve 50, which solenoid valve will pass air therethrough and through conduit 48 into elastomer clutch tube 28 so long as the temperature within clutch housing 6 does not exceed the predetermined setting of thermostat switch 38 to engage clutch plates 30 and 32 to drive the power takeoff shaft 16 in the manner set out above. FIGS. 5 and 6 show a battery 56 within a circuit 58, which circuit 58 is of the grounded type as indicated by grounds 60 and 62. However, a closed circuit is within the purview of the present device, and is equally as well adapted for use in grounded circuits as for use with ungrounded circuits.

A modified arrangement of a circuit is shown in FIGS. 7 and 8, whereby the circuit 58 has a normally closed thermostat switch unit 38a therein which energizes a solenoid 46a to maintain the solenoid valve 50a in open position at all times that electric current is impressed upon solenoid 46a. As long as the circuit 58 is closed and the solenoid 46a is energized, fluid, such as air, will flow through conduit 48 into the axially expansible elastomer clutch tube 28. However, upon the temperature within the clutch housing 6 being raised to a degree beyond the predetermined setting of thermostat switch 38a, the thermostat switch will open, as indicated in FIG. 8, which will direct the air from elastomer clutch tube 28 out through pipe fittings 26, conduit 24 to exhaust through outlet conduit 54 to atmosphere.

Having thus clearly shown and described the invention, what is claimed as new and desired to be secured by Letters Patent is:

1. In combination with a clutch housing;
a fluid actuated clutch, having friction members therein, within said clutch housing,
a conduit leading from a source of fluid pressure supply to said fluid actuated clutch,
a solenoid actuated valve within said conduit,
a solenoid associated with said valve,
a thermostat switch associated with said housing of said clutch in heat transfer relation,
an electric circuit associated with said thermostat switch, said solenoid actuated valve, and with a source of electricity,
said thermostat switch being responsive to the heat generated by the friction members of said clutch so as to effect said solenoid valve to render said clutch inoperative, when the temperature, which actuates said thermostat switch, reaches a predetermined degree.

2. A thermostat safety control unit in combination with a clutch housing, as defined in claim 1, wherein
said clutch housing has a cover thereon,
said cover has a hole formed therein,
said thermostat switch, having electrical contacts therein, is insertable in said hole in said cover so as to be in heat transfer relation with said fluid actuated clutch to actuate said electrical contacts thereon in response to the heat generated by said friction elements.

3. In combination, an internal combustion engine;
a clutch housing mounted on said internal combustion engine,
an air actuated clutch, having friction plates therein, which clutch is mounted within said clutch housing and is operatively associated with said internal combustion engine,
a conduit leading from a source of air pressure supply to said air actuated clutch,
a solenoid actuated valve within said conduit,
a solenoid associated with said valve,
a thermostat switch associated with said housing of said clutch in heat transfer relation,
an electric circuit associated with said thermostat switch, said solenoid actuated valve, and with a source of electricity,
said thermostat switch being responsive to heat, generated by the friction plates of said clutch so as to effect said solenoid valve to render said clutch inoperative when the temperature of said thermostat switch reaches a predetermined temperature.

4. A safety control system for an air actuated clutch, which clutch has friction members therein; which system comprises:
a clutch housing,
a thermostat switch within said clutch housing and being detachably associated with the clutch in heat transfer relation,
a conduit in fluid communication with the air actuated clutch,
a solenoid valve within said conduit,
a solenoid associated with said valve,
an electrical circuit operatively associated with said thermostat switch, and said solenoid of said solenoid valve, so upon the heat, generated by the slippage of said friction members within said clutch, reaching a predetermined degree, the heat will actuate said thermostat switch to energize said solenoid of said solenoid actuated valve to release air from the air actuated clutch to disengage the clutch.

5. A safety control system for an air actuated clutch as defined in claim 4; wherein
said clutch housing has a hole formed therein,
said thermostat switch, having electrical wires attached thereto, is detachably mounted in said hole in said housing for insertion thereinto and removal therefrom, as a composite wired unit, from the exterior of said housing.

References Cited
UNITED STATES PATENTS 1,988,413   1/1935   Bing.
2,005,468   6/1935   Modine.
2,614,396   10/1952   Ratermann.
3,237,404   3/1966   Flanigan et al.

BENJAMIN W. WYCHE, III, *Primary Examiner.*